Nov. 29, 1949     W. F. OWENS     2,489,809
APPARATUS FOR PACKING BEARINGS
Filed Jan. 27, 1947
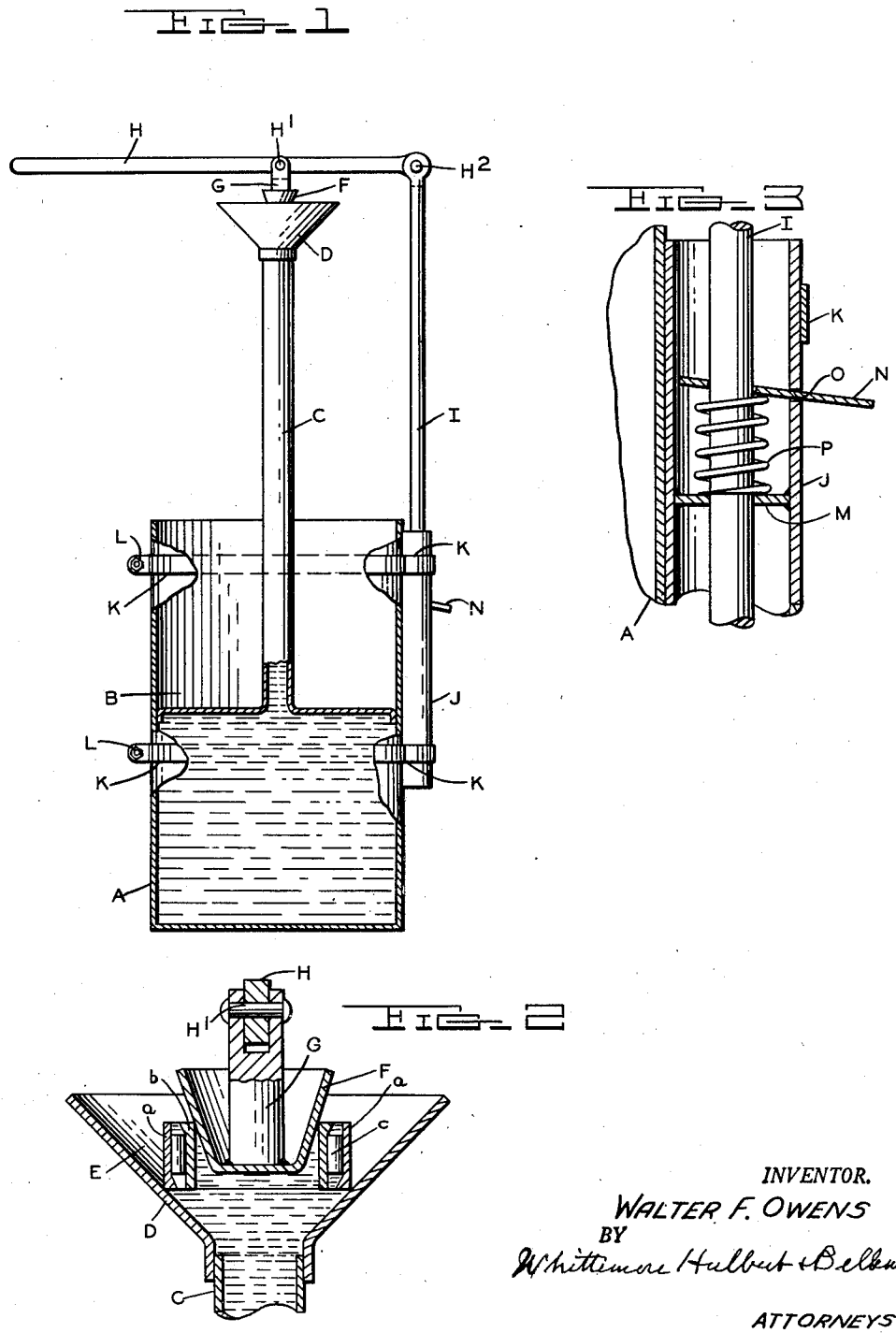
INVENTOR.
WALTER F. OWENS
BY
Whittemore Hulbert & Belknap
ATTORNEYS Patented Nov. 29, 1949

2,489,809

UNITED STATES PATENT OFFICE 2,489,809

APPARATUS FOR PACKING BEARINGS

Walter F. Owens, Detroit, Mich.

Application January 27, 1947, Serial No. 724,584

4 Claims. (Cl. 184—1)

The invention relates to the packing of roller bearings with lubricant grease and has for its object the more efficient operation in the packing of the bearing with avoidance of waste of the lubricant and the necessity of contacting the hands of the operator with the same.

It is a further object to effect the packing with lubricant directly from the barrel or container in which it is shipped. With these objects in view, the invention consists in the method and the apparatus as hereinafter set forth.

In the drawings:

Fig. 1 is a sectional elevation illustrating the method of packing a bearing with the lubricant directly from the barrel or container;

Fig. 2 is an enlarged cross-section showing the manner of holding the bearing while being packed; and Fig. 3 is a section illustrating the adjustable locking means or the fulcrum member.

The usual method of packing bearings is to immerse the same in a container for the lubricant grease with the result that they are coated outside as well as in and must be wiped off with a waste of lubricant. Also, the hands of the operator are thoroughly coated with grease during the operation. With my improved method the grease is forced directly from the container into the interstices of the bearing and without contact with the outer surface of the latter. The bearings to be lubricated are generally roller bearings of the type including ball bearings and bearings having cylindrical, conical and other shaped rollers. My improved method includes the steps of first clamping the bearing between a flaring cup and a conical plug, respectively engaging the outer and inner race members at opposite ends thereof, and then forcing the lubricant grease into said cup and between the race members of the bearing to fill all of the interstices between said race members and the rollers. The apparatus includes, in addition to the elements above mentioned, a piston for interiorly fitting the barrel or container for the lubricant, which piston is connected by an upwardly extending tube to the cup before mentioned. The piston is then forced downward by pressure applied to the plug and the displaced lubricant rises through the tube to pack the bearing.

More in detail and as illustrated, A is a cylindrical barrel or container for the lubricant. B is a piston loosely fitting the barrel and having an upwardly extending tube C of a length substantially equal to the height of the barrel. B is a flaring conical cup connected to the upper end of the tube C and adapted to receive roller bearings E of various dimensions. F is a conical plug member for engaging the inner race member of the bearing and which, as specifically shown, is a cup. G is a plunger extending down into the cup of the plug F. H is a lever pivotally attached at H' to the plunger G and also pivoted at H² to a fulcrum member I. The latter is preferably a rod of somewhat greater length than the height of the barrel and which is adjustably attached to the latter so that it may be lowered as the quantity of lubricant in the barrel is diminished. As shown, a hollow member J is clamped to one side of the barrel by split straps K and bolts L. The member J has an apertured shelf M through which the rod I extends. N is an apertured plate above the shelf M through which the rod I passes and which also extends outward through an aperture O in the member J. P is a spring sleeved on the rod between the shelf M and the plate N and operating to tilt said plate so as to frictionally clamp the rod. The arrangement is such that the upward pull on the rod I caused by the depression of the lever H will be resisted by the friction lock and carried into the member J and barrel A. However, at any time the lock N may be released and the rod I lowered to compensate for the lowering of the piston as the quantity of lubricant is diminished.

In operation, the bearings to be packed are successively clamped between the plug F and cup D and the lever H is then drawn downward to force down the piston B and eject lubricant from the barrel upward through the tube C. The outer race member $a$ of the bearing E forms a sealing engagement with the cup D and the plug F forms a similar sealing engagement with the inner race member $b$. The rollers $c$ are between these race members, but the interstices between the rollers provide space in which the lubricant will be packed as it is forced upward. As soon as the packing is completed, the lever is raised to remove the plug F whereupon hydrostatic pressure will withdraw the lubricant from the inner race member and downward in the tube C. A new bearing may then be clamped between the plug and cup and the packing operation repeated.

What I claim as my invention is:

1. Apparatus for packing bearings of the type having inner and outer race members and intermediate rollers comprising a cylindrical container for the plastic lubricant, a piston in said container for displacing the lubricant therein, a tube extending upward from said piston through which the lubricant is displaced, a flaring cup at the upper end of said tube in which the bearing is seated to form sealing engagement with the outer race member thereof, a conical plug for engaging the opposite end of the inner race member and forming a sealing engagement therewith, and means mounted on said container for forcing said plug, bearing, cup, tube and piston downward to displace the lubricant upwardly into said cup and to pack the interstices between said race members and rollers.

2. Apparatus for packing bearings of the type having inner and outer race members and intermediate rollers comprising a cylindrical container for the plastic lubricant, a piston in said container for displacing the lubricant therein, a tube extending upward from said piston through which the lubricant is displaced, a flaring cup at the upper end of said tube in which the bearing is seated to form sealing engagement with the outer race member thereof, a conical plug for engaging the opposite end of the inner race member and forming a sealing engagement therewith, an upwardly extending fulcrum member secured to said container, and a lever fulcrumed on said member and engaging said conical plug whereby downward pressure on said lever will displace the lubricant from said container through said tube and cup to fill the interstices between said race members and rollers.

3. Apparatus for packing bearings of the type having inner and outer race members and intermediate rollers comprising a cylindrical container for the plastic lubricant, a piston in said container for displacing the lubricant therein, a tube extending upward from said piston through which the lubricant is displaced, a flaring cup at the upper end of said tube in which the bearing is seated to form sealing engagement with the outer race member thereof, a conical plug for engaging the opposite end of the inner race member and forming a sealing engagement therewith, a hollow member having straps securing the same to said container at one side thereof, a rod extending upward from said hollow member, a friction clamp for securing said rod to said hollow member at different positions of adjustment, a lever fulcrumed on the upper end of said rod and engaging said plug whereby downward pressure on said lever will displace lubricant from said container upward through said tube and cup to pack the interstices between said race members and rollers.

4. Apparatus for packing bearings of the type having a race member, rollers and means for retaining said rollers in engagement with said race member comprising a cylindrical container for the plastic lubricant, a piston in said container above the lubricant therein, a tube extending upward from said piston through which the lubricant is displaced, a flaring cup at the upper end of said tube in which said bearing is seated to form a sealing engagement with said roller retaining means, a conical plug for engaging the upper end of said race member and forming a sealing engagement therewith, means attachable to said container for forcing said plug, bearing, cup, tube and piston downward to displace the lubricant upwardly into said cup and to pack the interstices between said race member and roller retaining means.

WALTER F. OWENS.

REFERENCES CITED

The following references are of record in the file of this patent:

UNITED STATES PATENTS

| Number | Name | Date |
|---|---|---|
| 1,991,542 | Cavanaugh | Feb. 19, 1935 |
| 2,140,909 | Green | Dec. 20, 1938 |
| 2,178,816 | Sibley | Nov. 7, 1939 |
| 2,396,124 | Pitisci | Mar. 5, 1946 |